April 24, 1928.
J. F. BORDEN
GAS SEPARATOR
Filed March 20, 1924
1,667,139
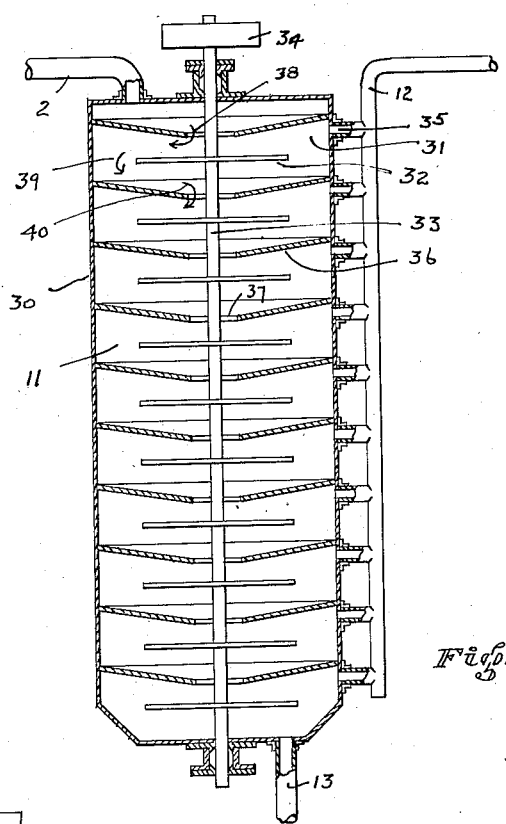
Fig. 2.
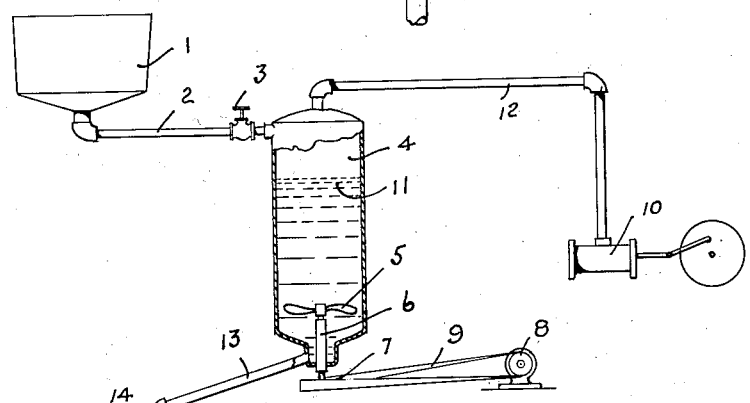
Fig. 1.
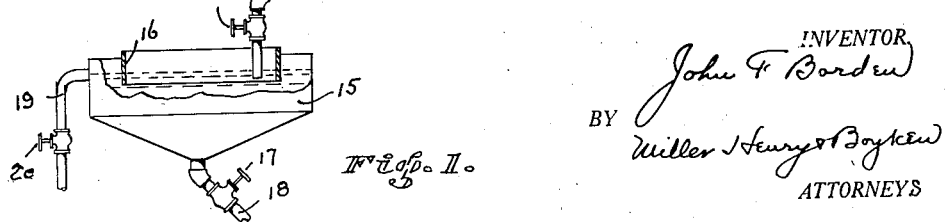
INVENTOR
John F. Borden
BY
Miller, Henry & Boykin
ATTORNEYS Patented Apr. 24, 1928.

1,667,139

UNITED STATES PATENT OFFICE.

JOHN F. BORDEN, OF ALAMEDA, CALIFORNIA, ASSIGNOR TO OLIVER CONTINUOUS FILTER COMPANY, OF OAKLAND, CALIFORNIA, A CORPORATION OF CALIFORNIA.

GAS SEPARATOR.

Application filed March 20, 1924. Serial No. 700,494.

My invention has for its object an apparatus for treating liquid and semi-liquid mixtures to effect the separation of solid, colloidal or other particles held in suspension therein, whereby a more efficient separation by gravity is readily attained.

Other objects will appear from the drawings and specifications which follow. These objects I attain by passing the mixture which it is desired to separate into its component parts, through a chamber or zone of reduced pressure, whereby entrained air or gases are abstracted from the mixture thus enabling the solid colloidal or other particles which may have been suspended therein to respond to the action of gravity more readily and settle out of the liquid or semi-liquid mass more quickly.

I have found that in separating the liquid and solid, colloidal or other particles from such substances as flotation froth, ore slimes in solution, beet and cane sugar juices that have been limed or otherwise treated, sewage sludge that has been treated or activated, and similar mixtures and industrial products, an efficient separation by gravity is retarded by the minute air or gas bubbles which have been generated in or absorbed by, or beaten into the mass.

A portion of these air or gas bubbles adhere to, or may be absorbed in the surface of the solid colloidal or other particles which it is desired to separate out. In this case, the air or gas bubbles are lighter than the liquid and the solid, colloidal or other matter is heavier than the liquid. It will be observed that the air or gas bubbles and the solid or colloidal particles, while they cling together, form an average mass more nearly the same specific gravity as the liquid, and therefore that the solid, colloidal or other particles will sink through the liquid at a relatively slow rate. The remaining portion of these air or gas bubbles exist in a free condition, disseminated throughout the liquid portion of the mixture. In this case the air or gas bubbles being lighter than the liquid that surrounds them, it will now be observed that these bubbles tend to rise to the surface of the liquid, and in so doing, create currents throughout the liquid that are counter to the desired downward motion of the descending particles, and therefore detrimental to efficient gravity separation.

It is the object of my invention, therefore, to disassociate the air and gas bubbles from the solid, colloidal or other particles in suspension in the liquid, and also from the liquid itself, by removing these from the mass, so that the solid, colloidal or other particles which it is desired to separate out, will thereafter more readily sink, under the action of gravity, through the remaining liquid.

By referring to the accompanying drawings my invention will be made clear.

Fig. 1 is a diagrammatic showing of one form of apparatus for practicing my invention.

Fig. 2 is a diagrammatic cross section of a special form of reduced pressure agitating separator.

Throughout the figures similar numerals refer to identical parts.

A tank containing the mixture of solid and liquid or semi-liquid mixture containing entrained air or gas, is indicated by the numeral 1, from which the pipe 2 conveys the mixture under the control of the valve 3 into the separating chamber 4.

Within the separating chamber 4 is shown a propeller or other agitating means 5, carried on a shaft in the sleeve 6 and driven by the pulley 7 from any conventional power source 8 as through the belt 9. At 10 is a conventional vacuum apparatus and at 12 a connecting pipe. A vacuum of any desired degree is established in chamber 4 by which the gas or air is abstracted from the mixture 11 while contained in the separating chamber 4.

At 13 is an outlet pipe which under the control of the valve 14, discharges the treated material into the settler 15. The settler is provided with an open cylindrical ring 16 to reduce surface agitation from the inflowing mixture and is provided with an outlet valve 17 and discharge pipe 18 for conveying away the settled material, and an overflow pipe 19 and valve 20 for discharging the liquid from which the material has been separated by the action of gravity while in the settler 15.

The type of separating chamber in Fig. 2 comprises a plurality of sloping diaphragms 36 open at their centers 37 and having vacuum passage outlets 35 and agitating discs 32 driven by shaft 33 and pulley 34. The mixture taking the tortuous course shown by the arrows 38, 39, 40.

The operation is as follows:

Material is introduced through the tank 1 and connection 3 into the separator 4 wherein it is agitated or its mass disrupted while being subjected to any required degree of vacuum, depending upon the substance being treated, the temperature, atmospheric pressure and other well known factors. The degree of vacuum may be anything from zero to atmospheric pressure to effect the desired gas separation. Likewise the intensity of agitation or disruption of the mixture may vary according to requirements.

While the material 11 is contained in the chamber 4 and under the action of the vacuum, it is agitated or disrupted as by the propeller 5. If the chamber 30 (see Fig. 2) be employed the agitation or disruption is effected by the plurality of discs 32 on shaft 33 which is rotated at any desired speed by any conventional source of power through the pulley 34, or if desired, kept stationary, in such case the discs serving as a plurality of baffles to the descending mixture.

The mixture flows down over the sloping diaphragms 36, through the center openings and on the rotating discs 32, from these it is thrown outward and again caught on the walls of 11 and diaphragms 36 and thus follows a tortuous passage during which it is subjected to continuous agitation or disruption. When the discs are stationary the mixture falls and is caught upon the diaphragms 36.

It is to be noted that to maintain the desired degree of vacuum in the separating chamber the column of mixture in the pipe 13 and down to the liquid surface in 15 must have a vertical height sufficient to overcome the vacuum and in addition a sufficient fall to maintain the desired velocity of flow under the well known formula $V = \sqrt{2gh}$. And the size of the pipes must be calculated with this available velocity in mind.

In Fig. 1 the column of mixture available for the said purpose is the vertical difference between the surfaces of the mixture in chamber 4 and settler 15, whereas in the type of chamber shown in Fig. 2 such column is only that vertical distance from the inlet of pipe 13 to the surface of the mixture in the settler 15. Where desired, the mixture subsequent to treatment in chambers 4 or 30 may be transferred to the settler 15 by means of a pump of proper design, placed in the line 13.

The period of treatment in the separating chamber should be such as to enable the air or gas to be separated from the mixture to the maximum degree practicable and will vary with different mixtures and conditions.

I have found in the case of sugar juices the period of from ten to twenty seconds will usually accomplish the desired result.

After the gas abstraction step, the material flows or is pumped through the pipe 13 into the settler 15 where it will be found that the solid, colloidal or other matter suspended in the liquid responds more readily to the action of gravity than by methods heretofore employed.

Particular attention is directed to the process being continuous where desired. It is not necessary to treat the material from the tank 1 in batches. It flows in through the valve 3 at such a rate and out from the valve 14 at such a rate that it receives the required period of extraction treatment while in the chamber 4.

By employing my method, the period of subsequent settling is greatly reduced and the separation more efficiently accomplished than where gravity alone is depended upon to effect such separation.

I claim:

Apparatus of the character described comprising a vertically arranged cylinder with means at its upper end for controlling the admission of fluid thereto, a series of spaced shelf partitions within the cylinder each slanted downwardly and with an opening through the lowest portion, a spreader disk positioned between each pair of shelves adapted to spread material passing through the opening of one shelf to the outer portion of the next shelf, means for rotating the spreader disks, and means for applying a suction just below the highest portion of each shelf.

JOHN F. BORDEN.